(12) United States Patent
Muona

(10) Patent No.: US 10,392,863 B2
(45) Date of Patent: Aug. 27, 2019

(54) ARRANGEMENT FOR ASSIGNING AND DRILLING BORE HOLES

(71) Applicant: SANDVIK MINING AND CONSTRUCTION OY, Tampere (FI)

(72) Inventor: Juoko Muona, Tampere (FI)

(73) Assignee: SANDVIK MINING AND CONSTRUCTION OY, Tampere (FI)

( * ) Notice: Subject to any disclaimer, the term of this patent is extended or adjusted under 35 U.S.C. 154(b) by 0 days.

(21) Appl. No.: 14/889,182

(22) PCT Filed: May 8, 2013

(86) PCT No.: PCT/EP2013/059613
§ 371 (c)(1),
(2) Date: Nov. 5, 2015

(87) PCT Pub. No.: WO2014/180502
PCT Pub. Date: Nov. 13, 2014

(65) Prior Publication Data
US 2016/0084071 A1    Mar. 24, 2016

(51) Int. Cl.
| | | |
|---|---|---|
| E21B 7/02 | (2006.01) |
| B23Q 5/26 | (2006.01) |
| B25D 17/32 | (2006.01) |
| G05B 19/404 | (2006.01) |
| E21B 44/00 | (2006.01) |
| B23Q 5/32 | (2006.01) |
| E21B 15/00 | (2006.01) |
| E21D 9/00 | (2006.01) |
| E21B 41/00 | (2006.01) |
| E21B 44/02 | (2006.01) |
| E21B 47/024 | (2006.01) |

(52) U.S. Cl.
CPC ............. *E21B 7/022* (2013.01); *B23Q 5/265* (2013.01); *B23Q 5/326* (2013.01); *B25D 17/32* (2013.01); *E21B 7/025* (2013.01); *E21B 41/0092* (2013.01); *E21B 44/00* (2013.01); *E21B 44/02* (2013.01); *E21B 47/024* (2013.01); *E21C 11/00* (2013.01); *E21D 9/006* (2013.01); *G05B 19/404* (2013.01)

(58) Field of Classification Search
CPC .......... E21B 7/022; E21B 7/025; E21B 44/00; E21C 11/00; B23Q 5/265; B23Q 5/326; B25D 17/32; G05B 19/404
See application file for complete search history.

(56) References Cited

U.S. PATENT DOCUMENTS

| | | | |
|---|---|---|---|
| 4,118,071 A * | 10/1978 | Hutchins | ................. E21C 41/24 166/259 |
| 4,230,189 A | 10/1980 | Mashimo | |
| 6,293,355 B1 | 9/2001 | Koivunen et al. | |

(Continued)

FOREIGN PATENT DOCUMENTS

WO    WO-2013044345 A1 *  4/2013  ............. E21C 35/00

*Primary Examiner* — David J Bagnell
*Assistant Examiner* — Tara E Schimpf
(74) *Attorney, Agent, or Firm* — Corinne R. Gorski

(57) ABSTRACT

An apparatus and method for assigning drill holes. The apparatus is arranged to determine a forthcoming position of a bottom of a new drill hole before it is drilled. The forthcoming position of the drill hole bottom is determined on the basis of the current location and direction of a tool and a planned length of the drill hole.

17 Claims, 4 Drawing Sheets

(56) References Cited

U.S. PATENT DOCUMENTS

| | | |
|---|---|---|
| 2010/0044107 A1 | 2/2010 | Keskinen |
| 2010/0078215 A1* | 4/2010 | Saleniemi ............... E21D 9/006 |
| | | 175/24 |
| 2010/0086359 A1 | 4/2010 | Saleniemi |
| 2010/0286965 A1 | 11/2010 | Saleniemi et al. |
| 2011/0100711 A1* | 5/2011 | Puura ..................... E21B 7/025 |
| | | 175/24 |
| 2014/0313502 A1* | 10/2014 | Steele ..................... E21C 35/00 |
| | | 356/4.01 |

* cited by examiner

ARRANGEMENT FOR ASSIGNING AND DRILLING BORE HOLES

RELATED APPLICATION DATA

This application is a § 371 National Stage Application of PCT International Application No. PCT/EP2013/059613 filed May 8, 2013.

BACKGROUND OF THE INVENTION

The invention relates to an apparatus for assigning positions of drill holes for a round to be drilled by a rock drilling rig.

The invention further relates to a method for drilling a round and to a software product for executing the disclosed method.

The field of the invention is defined more specifically in the preambles of the independent claims.

In mines rock is excavated in rounds. Several successive rounds produce a production tunnel having a tunnel face. At first drill holes are drilled to the tunnel face, where after the drilled holes are charged and blasted. Rock material of the amount of one round is detached from the rock at one blasting time. The detached rock material is transported away from the production tunnel for further treatments. For excavating the rock, a drilling pattern, or drill hole pattern, is made in advance and information on the rock type, for example, is determined. In general, also the owner of the mine may set various quality requirements for the excavation process. Typically, the drilling pattern is designed as office work for each round. The pattern is provided for the rock drilling rig to drill holes in the rock in such a way that a desired round can be formed. However, use of the beforehand planned drilling patterns have some disadvantages.

BRIEF DESCRIPTION OF THE INVENTION

An object of the invention is to provide a novel and improved apparatus, method and software for drilling a round.

The apparatus according to the invention is characterized in that the apparatus is configured to: determine the actual position of at least one realized drill hole bottom by detecting the position of the tool on the bottom of the round during the drilling process; determine for a new, currently active drill hole the forthcoming position of the drill hole bottom before drilling the new drill hole, wherein the determining is based on the current location and direction of the tool and on the predetermined length of the new drill hole; and indicate the determined position of the forthcoming drill hole bottom of the new drill hole in relation to the realized drill hole bottoms on the bottom of the round.

The method according to the invention is characterized by determining the forthcoming position of the bottom of a new drill hole before drilling the new drill hole, wherein the position of the new drill hole bottom is determined on the basis of the current location and direction of the tool and on the planned length of the new drill hole.

The software product according to the invention is characterized in that the computer program product comprises program code means configured to execute the steps and procedures disclosed in the independent claims when being run on a computer or a data processing device.

An idea of the disclosed solution is that the forthcoming position of the bottom of a new drill hole is determined before drilling a new drill hole. The forthcoming position of the new drill hole bottom is determined on the basis of a current location and direction of a drilling tool and a planned length of the new drill hole.

An advantage of the disclosed solution is that the disclosed assigning feature of the forthcoming positions of the drill hole bottoms aids the operator of the rock drilling rig when drilling the round. This facilitates positioning of the drilling tool at starting points of drill holes and directing the tool for the drilling so that the drill hole bottom will be positioned at the desired place. The disclosed assigning feature allows accurate manual designing of the drill hole positions.

According to an embodiment, the apparatus is arranged in a rock drilling rig. The rock drilling rig comprises a carrier, at least one drilling boom, at least one rock drilling unit, a drilling tool connected to the drilling unit, and at least one control unit. The rock drilling rig may be an underground rock drilling rig. The rock drilling rig may comprises only one drilling boom and one drilling unit, or alternatively, it may comprise several drilling booms provided with the drilling units. The rock drilling rig may be a production drilling rig the only purpose being drilling holes, which are being charged in a separate charging step.

According to an embodiment, the data processing unit of the apparatus is integrated in the control unit of the rock drilling rig. Alternatively, the rock drilling rig may comprise at least one dedicated processing unit for executing the disclosed solution and it's embodiments.

According to an embodiment, the rock drilling rig is provided with sensing means for determining the current position and direction of a drill bit of the tool. The drilling boom may be equipped with sensors, which detect positions of the boom parts. Articulations between the boom parts may be provided with sensors. The sensing data may be provided to the data processing unit wherein the position and direction may be calculated. Alternatively, the position and direction of the tool can be detected by external measuring or sensing means. A laser measuring device arranged to a work site may be utilized, for example.

According to an embodiment, the drilling of the round is initiated without a predetermined drilling pattern defining the positions and directions of the drill holes to be drilled. Thus, the drilling is executed without any drilling pattern made as office work. Instead, the drilling control takes into account realized drill holes when determining the positions and directions of the undrilled drill holes. Thanks to this, the drilling process is simpler and does not require any dedicated designer. Since the realized drill holes affect to the forthcoming drill holes, the end result is precise too. Further, the disclosed solution suits well to situations where successive rounds differ from each other and a plurality of individual drilling patterns are needed for them.

According to an embodiment, the apparatus determines actual position of the realized drill hole bottom when drilling of the drill hole is completed. Then position and direction of the tool on the bottom of the round is determined in a processing device by means of received sensing data. Since the realized drill hole positions are detected, the apparatus is capable of placing or assigning a new drill hole next to the realized drill holes. The apparatus may also indicate the position of the forthcoming drill hole bottom of the new drill hole in relation to the at least one realized drill hole bottom on the bottom of the round.

According to an embodiment, a new drill hole is placed according to at least one predetermined allowable spacing range defining a minimum drill hole spacing and a maximum drill hole spacing between drill hole bottoms. The allowable spacing range may be determined according to the used explosive and charging, and also taking into account location of the drill hole to be drilled. Then, the allowable spacing range may be different in different sections of a facing of the round. One or more spacing ranges may be determined as office work and may be input to the processing device. The spacing ranges may also be stored in a memory device and may be retrieved by the processing device.

According to an embodiment, drill holes are placed in two or more rows at the face of the round to be drilled. At first, new drill hole bottoms are placed in one drill hole row and two or more drill holes are drilled in the row. Thereafter actual spacing between the realized drill hole bottoms in the drill hole row is determined. Based on the determined realized spacing burdens are determined for the realized drill hole bottoms. Minimum and maximum burdens corresponding to the predetermined minimum drill hole spacing and maximum drill hole spacing are predetermined and may be input to the processing device. The processing device employs the predetermined minimum and maximum burdens when determining the burdens. The burdens can be determined using interpolation between the minimum burden and the maximum burden when the determined spacing of the realized drill hole bottoms are taken into account. Then position of a next drill hole row can be determined according to the determined burdens of the realized drill hole bottoms locating in the previous drill hole row. The determined burdens define distances between the realized drill hole bottoms and the successive drill hole row. New drill hole bottoms may be determined and placed in the next drill hole row.

According to an embodiment, drilling of the round is initiated at a contour of the face of the round to be drilled. Then, a first drill hole row is a contour row. Inside the contour row are placed one or more aid rows. At first, two or more holes are placed in the contour row and their realized spacing is defined so that burdens can be determined by means of interpolation between the predetermined minimum and maximum burdens as disclosed above. A first aid row is then determined at a distance inside the contour row, the distance corresponding to the interpolated burdens. As the drilling of the face proceeds, several drill rows may be determined one after each other towards a cut. Thus, the design of the drilling pattern is generated during the drilling procedure outside-in.

According to an embodiment, the rock drilling rig comprises two or more drilling booms provided with drilling units. A first drilling unit may continue drilling of a previous drill hole row, such as a contour row, whereas a second drilling unit may drill holes of the determined successive drill hole row, such as in a first aid row. Alternatively, the drilling of the previous drill hole row is first completed by using all available drilling units and only thereafter drilling of the successive drill hole row is initiated.

According to an embodiment, the apparatus comprises at least one display device. The apparatus may indicate the determined position of the new forthcoming drill hole bottom on one or more display devices. The position of the new drill hole bottom may be shown in relation to the realized drill hole bottoms whereby a clear view of the situation is offered for the operator of the rock drilling rig. This embodiment allows easily understandable visual data to be served for the operator of the rock drilling rig. Visualization facilitates significantly the work of the operator.

According to an embodiment, the apparatus is configured to employ a predetermined spacing range for the new drill hole bottom. Further, the apparatus comprises one or more display devices and the apparatus is configured to indicate on the display device allowable spacing according to the spacing range and in relation to the closest realized drill hole bottom.

According to an embodiment, the apparatus indicates the forthcoming drill hole bottom as a symbol on the display device. A visual symbol is fast and easy to note on the display. The visual symbol may be a circle, or alternatively, it may any other suitable geometrical pattern, character or symbol.

According to an embodiment, the apparatus employs a predetermined spacing range and indicates a minimum drill hole spacing as a first circle around the symbol. Further, maximum drill hole spacing may be indicated as a second circle around the first circle. Thus, between the first and second circle is an acceptable tolerance for the drill hole spacing. Diameters of the first and second circles correspond to the predetermined minimum and maximum drill hole spacing. Thus, the greater the space between the circles is, the greater is the allowed tolerance, and vice versa. The circles may be shown on the display device using different colors or shadings too. This embodiment facilitates the work of the operator. The operator may fine-adjust positioning and directioning of the tool by monitoring the circles so that the desired drill hole spacing is obtained. Thus, the circles may also improve quality and accuracy of the drilling.

According to an embodiment, the apparatus indicates on the display device realized drill hole spacing by means of visual attention markings. Thanks to the attention markings, the operator notes instantly situation of the realized spacing and the operator may take that information into account when drilling next drill holes. Thus, the visual attention markings provide the operator with instant feedback.

According to an embodiment, the apparatus indicates on the display device a first attention marking indicating too short a drill hole spacing relative to the determined minimum drill hole spacing. The first attention marking may be a double line, which is generated between the realized drill hole bottoms.

According to an embodiment, the apparatus indicates on the display device a second attention marking indicating too long a drill hole spacing relative to the determined maximum drill hole spacing. The second attention marking may be a single line with attention coloring. Thus, the second attention marking may be a single red line, which is generated between the realized drill hole bottoms.

According to an embodiment, the apparatus indicates on the display device a third attention marking indicating a drill hole spacing being according to the predetermined set spacing range. The first attention marking may be a single line, which is generated between the realized drill hole bottoms. The color of the single line may be the same as other basic objects, or it may be green, for example.

According to an embodiment, the apparatus is arranged to monitor realization of the set spacing ranges. Then the apparatus may be configured to observe exceed of the allowed maximum spacing of the drill hole bottoms. On the basis of such an observation, the apparatus may propose an additional drill hole to be drilled close to the previous realized drill hole. Thus, it is easy for the operator to execute an instant corrective action when a deviation is detected.

According to an embodiment, the apparatus is arranged monitor realization of the set spacing ranges and is arranged to observe if the realized spacing is shorter than the allowed minimum spacing. On the basis of that, the apparatus may produce a data element comprising identification of the observed drill hole and information of the observed drill hole spacing. Thus, on the basis of the data element, the deviating drill hole can be noted afterwards when the drilling of the round is completed and then suitable measures following the drilling may considered.

According to an embodiment, the apparatus observes if the realized spacing is shorter than the allowed minimum spacing and may produce and store a charging data element. The charging data element comprises information allowing decreased charging of the observed drill hole. The charging data element may be input to a control device of an automated charging device, which diminishes charging in the deviating drill hole, or alternatively the post drilling charging device executes the charging with another explosive as used in the neighboring drill holes.

According to an embodiment, the apparatus is configured to show the drill hole bottoms on a display device as a drill hole pattern. The drill hole pattern comprises several drill hole rows such as an outermost contour row of the round and an outermost first aid row inside the contour row. Inside the first aid row may be one or more additional aid rows. The contour row and aid rows each comprise wall sections, bottom sections and roof sections. Individual spacing ranges are determined for the wall, bottom and roof sections of each of the drill hole rows. Further, the sections may also be provided with individual minimum and maximum burdens. The operator informs the apparatus what drill hole row and what section of the drill hole row is under operation. User interface of a control unit may allow the operator to make easily selections on a display device, for example.

According to an embodiment, the apparatus employs at least one predetermined drilling scenario comprising at least one allowable spacing range of the drill hole bottoms and a predetermined minimum burden and a maximum burden calculated for a minimum spacing and a maximum spacing of the at least one spacing range. Further, the apparatus defines realized spacing between the realized drill hole bottoms. Burdens are determined for the realized drill hole bottoms according to the realized spacing by means of interpolation between the minimum burden and the maximum burden. The interpolation is rather simple and does not require efficient processing capacity. Thus, there is no need to input complex blasting-technical data to the control unit of the rock drilling rig and to any perform complex blasting calculations therein.

According to an embodiment, the apparatus is configured to define the realized spacing between the realized drill hole bottoms on a first drill hole row. Based on that, the apparatus may assign the second drill hole row at a distance from the first drill hole row. The distance between the drill hole lines is set according to the determined burdens of the realized drill hole bottoms on the first drill hole row. Thus, the calculation of burdens, and the resulting distances between successive drill hole rows, is based on positions of the realized drill hole bottoms.

According to an embodiment, the apparatus determines look-out angles for drill holes located in an outermost drill hole row of the round. The processing device may propose for the operator suitable look-out angles and the operator may select and confirm them. The angles may be predetermined, or the processing device may calculate them based on current situation. This feature may also facilitate the work of the operator.

According to an embodiment, the apparatus retrieves a predetermined drilling scenario, which comprises a predetermined cut for the round. The cut may comprise several precisely determined drill holes forming a drill hole group. The operator may place the cut to a desired location inside the innermost aid row. Then the operator does not need to design the cut. Designing the cut is typically a time consuming task.

According to an embodiment, several selectable predefined cuts are stored in a memory device. The operator may then select a suitable cut and place the selected cut to a desired location in the drill hole pattern.

According to an embodiment, the apparatus retrieves a predetermined drilling scenario comprising a sketch of an outer contour of the round. The scenario may further comprise a cut, and also spacing ranges and minimum and maximum burdens for different sections of the drilling pattern.

According to an embodiment, the operator may define basic profile and dimension of the outer contour by selecting a basic shape of the profile and feeding dimensions. Several basic profiles may be loaded to the processing device allowing the selection before starting the drilling.

According to an embodiment, the apparatus may comprise automated positioning and drilling features. The apparatus may position the tool automatically at the starting points of the drill holes in a drill hole line and it may also control drilling of the holes. When the drilling of the previous drill hole line is completed, then the operator may manually position and drill some drill holes in the determined next drill hole line. The apparatus may thereafter continue drilling of the next drill hole line and complete the drilling. The operator may at any instance take control of the positioning and drilling operations. The apparatus may be arranged to receive a control command to initiate an automatic mode for drilling the new drill hole or the drill hole line.

According to an embodiment, the apparatus may comprise cracking control means. Then the apparatus determines a cracking area for one or more realized drill hole bottoms. The determined cracking area may be displayed on a display device and it may be shown on the display in relation to a predetermined greatest allowable cracking zone. Thus, the operator may instantly see on the display device the determined cracking area and the allowable cracking zone, whereby easily noted data is served for the operator.

The above disclosed embodiments can be combined in order to form suitable solutions provided with necessary features.

BRIEF DESCRIPTION OF THE FIGURES

Some embodiments are described in more detail in the accompanying drawings, in which.

For the sake of clarity, the figures show some embodiments of the disclosed solution in a simplified manner. In the figures, like reference numerals identify like elements.

DETAILED DESCRIPTION OF SOME EMBODIMENTS

Figure 1:
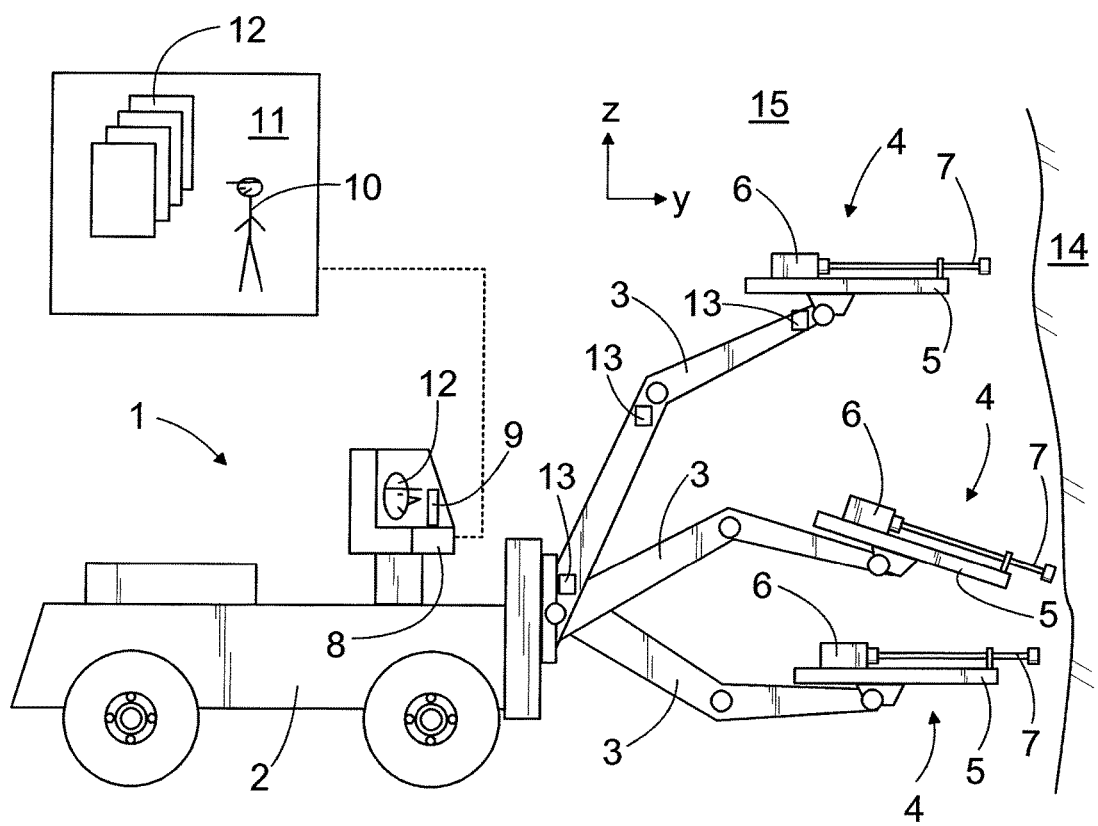
FIG. 1 is a schematic side view showing a rock drilling rig.

FIG. 1 shows a rock drilling rig 1 comprising a movable carrier 2, one or more drilling booms 3 and drilling units 4 arranged in the drilling booms 3. The drilling unit 4 comprises a feed beam 5 on which a rock drilling machine 6 can be moved by means of a feed device. Further, the drilling unit 4 comprises a tool 7 with which the impact pulses given by the percussion device of the rock drilling machine are transmitted to the rock to be drilled. The rock drilling rig 1 further comprises at least one control unit 8 arranged to control actuators of the rock drilling rig 1, for example. The control unit 8 may be a computer, processing device or a corresponding device, and it may comprise a user interface with a display device 9 as well as control means for giving commands and information to the control unit 8. The control unit 8 may be one computer equipped with appropriate software, or an entity consisting of a plurality of computers.

Typically a drilling pattern is designed in an office 11 and is loaded to the control unit 8 of the rock drilling rig 1 and implemented. However, in this aplication it is disclosed a differing solution according to which no predesigned complete drilling pattern is needed. Instead the drilling pattern may be generated during the drilling process taking into account already realized drill holes. A supervisor 10 or the owner of the mine may sit remote from the rock drilling rig 1, for example in the office 11, having one or more drilling scenarios or other basic data elements 12, which are to be taken into consideration during the drilling. The set data may be input to the control unit 8 or it may be stored to one or more memory devices so that it can be retrieved by the control unit 8. The operator of the rock drilling rig 1 controls the drilling interactively with the control unit 8.

FIG. 1 further discloses that measuring or sensing means 13 may be arranged to determine current position and direction of the tool 7. Needed sensor means 13 may locate in the boom 3, or alternatively the sensing may be executed remotely from the carrier of even elsewhere. The sensing data is provided to the control unit 8, which may execute needed calculations.

In FIG. 1 a face 14 of a tunnel 15 is also shown.

Figure 2:
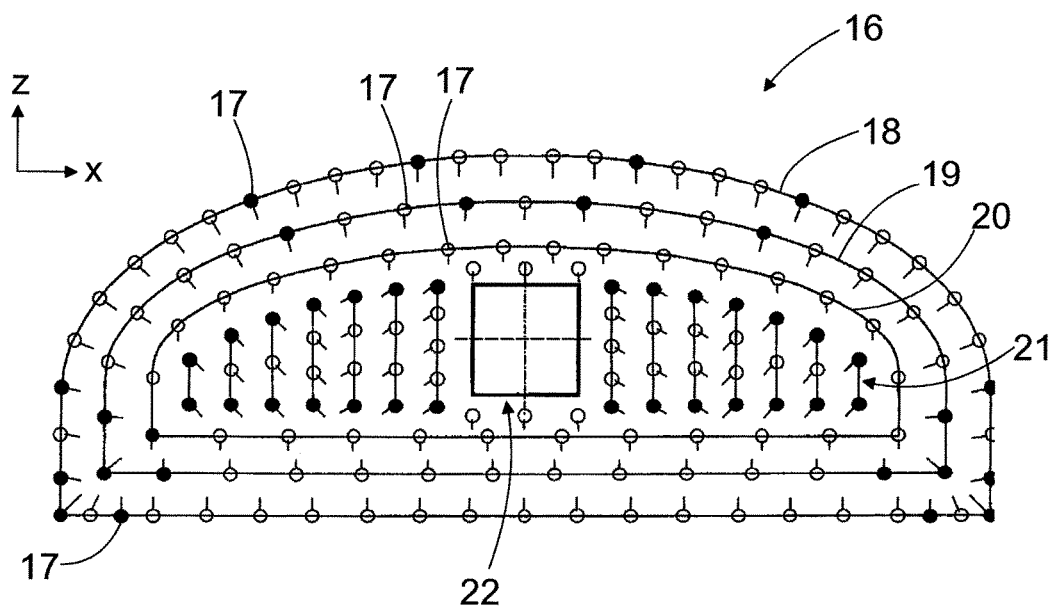
FIG. 2 is a schematic view showing a drilling pattern.

FIG. 2 shows a drilling pattern 16 as a general concept. The drilling pattern 16 may comprise several drill holes 17 arranged in several drill hole rows 18 to 20 within each other. Further, the drilling pattern 16 may comprise field holes 21 arranged in the section between an innermost drill hole row 20 and a cut 22. The cut 22 comprises several drill holes, which are not shown in FIG. 2. The outermost drill hole row is a contour row 18, the next inner drill hole row is a first aid row 19, the next inner row after that is a second aid row 20 etc. Thus, there may be one or more aid rows. In the drilling pattern 16, the drill hole 17 may be shown as a circle. Further, the direction of each drill hole 17 may be denoted by a line of direction in the drilling pattern 12. An xz projection of the drilling pattern 16 having one or more corresponding features as shown in FIG. 2 may be shown in the display device 9 of the rock drilling rig 1.

Figure 3:
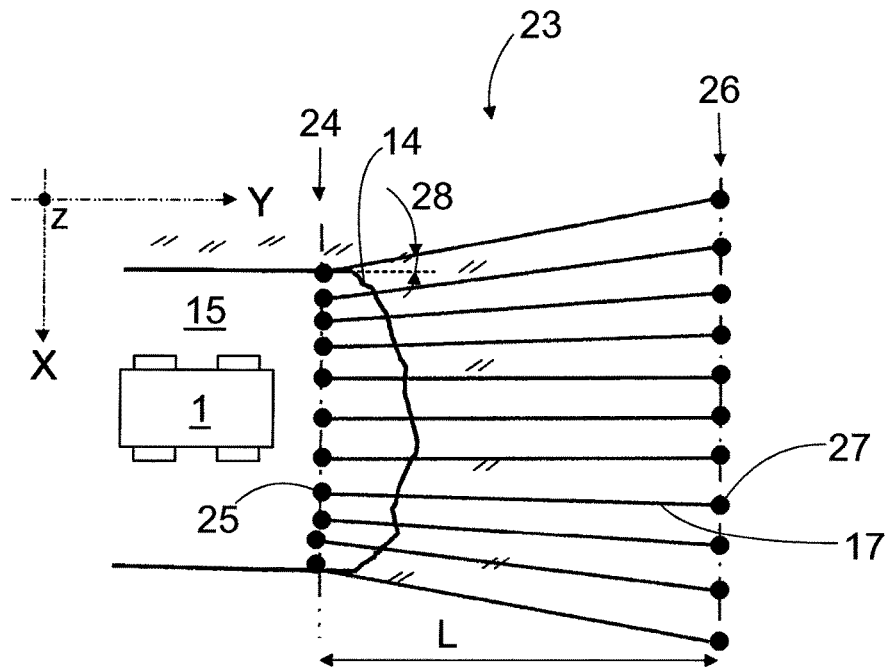
FIG. 3 is a schematic top view showing a round.

FIG. 3 shows from above the principle of drilling a round 23. In a face 14 of a tunnel 15 to be excavated, or in front of the face 14 there may be a navigation plane 24, to which the coordinate system of the drilling rig 1 is attached. Starting points 25 of the drill holes 17 are placed on the navigation plane 24. The drill holes 17 extend to a bottom 26 of the round 23. Drill hole bottoms 27 are then placed on the bottom 26. Length L of the round 23 defines a distance between the navigation plane 24 and the bottom 26 of the round 23. Drill holes locating on a contour line may be angled outwards. Thus, these drill holes have look-out angles 28.

As it is discussed above in this application, the apparatus may determine the forthcoming position of the bottom of a new drill hole before drilling a new drill hole. The forthcoming position of the drill hole bottom may be shown on a display device. The drilling situation may be examined on the bottom of the round, whereby the display device shows the drill hole bottoms and their relative position.

Figure 4:
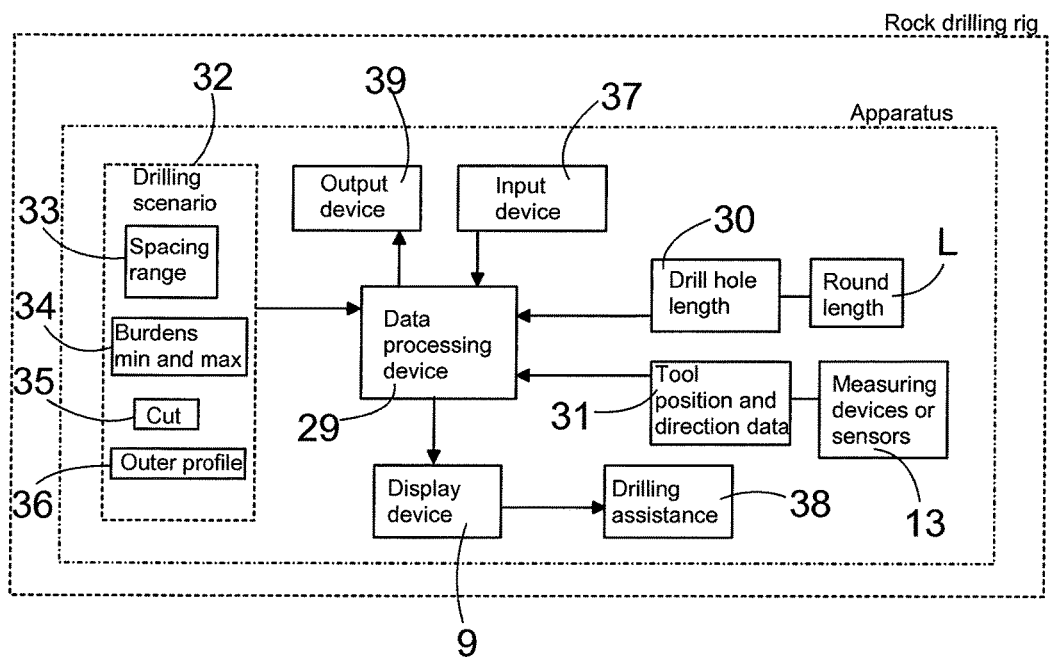
FIG. 4 illustrates a simplified control block diagram of an apparatus allowing at least assigning of drill hole bottoms.

FIG. 4 is a simplified control block illustrating a configuration of the disclosed apparatus. As shown, the apparatus may be arranged to a rock drilling rig. The apparatus comprises at least a processing device 29 for determining current position and direction of a tool and assigning a forthcoming drill hole bottom on a bottom of a round. Drill hole length 30 is input to the processing device 29 as well as sensing data 31 received from sensors detecting position and direction of a boom and the tool. A drilling scenario 32 may also be input to the processing device 29. The scenario 32 may comprise a predetermined spacing range data 33 and burden data 34 for drill holes locating in different sections of a face of the round or in a drilling pattern. The scenario 32 may further comprise a predetermined cut data 35 and selectable outer profiles data 36 of the drilling pattern. The spacing ranges, burdens, cut and profile data may also be input to the processing device 29 as individual data elements or may be retrieved from one or more memory devices. The processing device 29 comprises a computer program product, which is executed. The computer program may be recorded on non-transitory computer-readable media including program instructions for implementing various operations executed by a computer. The operator may input data and make selections via one or more input devices 37. The input device 37 may be a touch screen, a keypad, a mouse or any other suitable control device. By means of the input device 37, the operator of the rock drilling rig may inform the processing device 29 in which drill hole line and in which section of the drill hole line the tool is currently located, for example. The operator may also instruct the processing device 29 to calculate a position of a successive drill hole row, and to give any other control commands to the processing device 29. The processing device 29 may execute needed calculations and may display drilling data on a display device 9. The processing device 29 may also provide the operator with predetermined drilling aid 38 and may show assisting symbols and data on the display device 9. Further, the apparatus may comprise an output device 39 for storing produced data on a memory device or transmitting the data to another control unit or mining vehicle. Let it be mentioned that the processing device 29 and a control unit 8 of the rock drilling rig 1 may be separate devices or they can be integrated.

Figure 5:
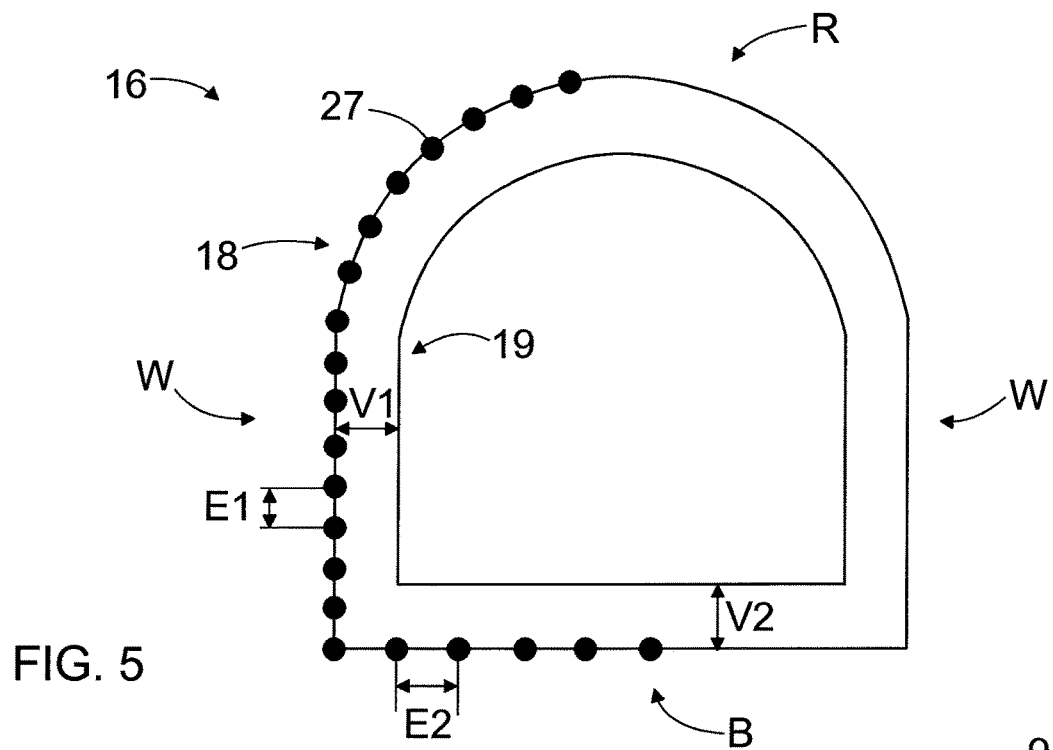
FIG. 5 is a schematic view showing an outer contour and a first aid row of a drilling pattern generated during drilling.

FIG. 5 discloses a drilling situation on a bottom of a round. Several drill holes are drilled and their bottoms 27 locate in a contour row 18. Inside the contour row 18 is a first aid row 19. The drill hole rows comprise sections such as wall sections W, roof sections R and bottom sections B. Different charge classes are used in different sections, and based on that, spacing E1 and E2 between the drill hole bottoms 27 may be different in different sections. Further, burdens V1 and V2 may be differ in different sections, whereby distance between the successive drill hole rows varies. These basic principles facilitate understanding of the embodiments disclosed in this application.

Figure 6:
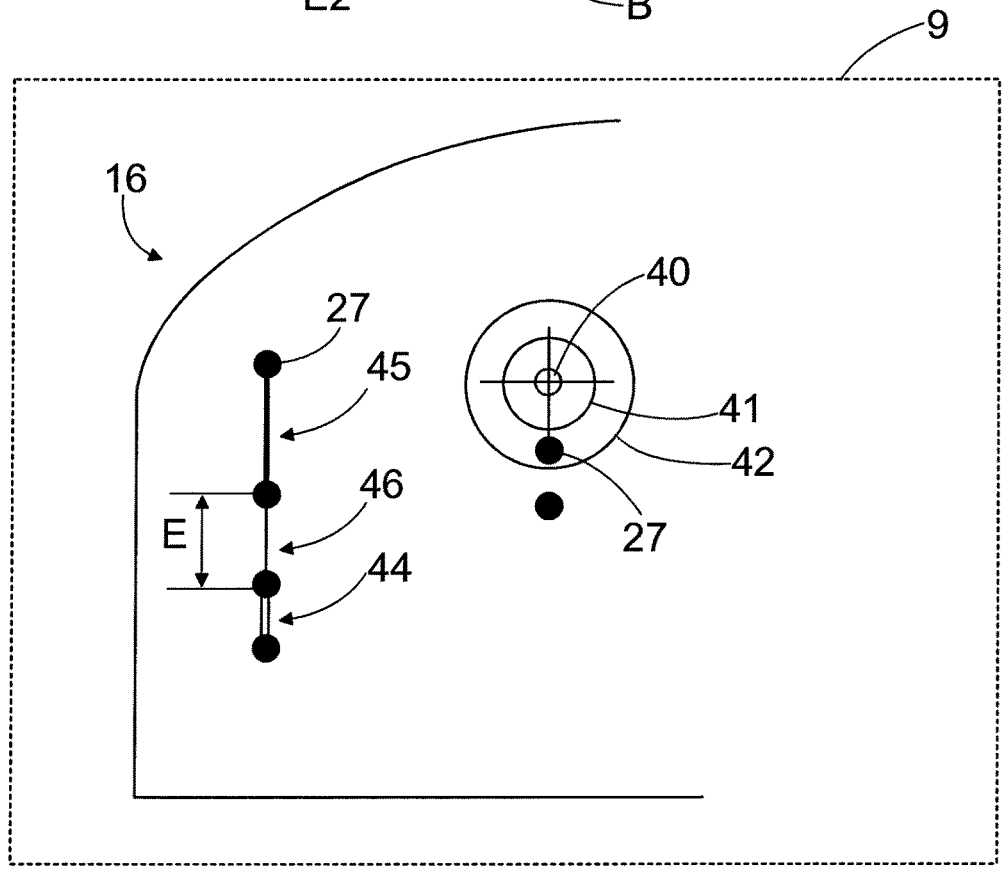
FIG. 6 is a schematic view showing some visual symbols on a display device for assisting the work of the operator.

FIG. 6 discloses a display device 9 view on a bottom of a round. On the display device 9 a symbol 40 of a forthcoming drill hole bottom may be shown. Around the symbol 40 there may be a first circle 41 indicating minimum drill hole spacing and a second circle 42 indicating maximum drill hole spacing. Between the circles is an allowable spacing. At the currently shown position the new drill hole bottom will be formed at an allowable spacing from the realized drill hole bottom 27.

FIG. 6 further discloses that the apparatus may indicate on the display device whether the realized drill hole bottoms 27 are according to the spacing range or not. A first visual attention marking 44 may visualize that the spacing E is too short. A second attention marking 45 may visualize that the spacing E is too long, and a third attention marking 46 may visualize that the spacing is proper.

Figure 7:
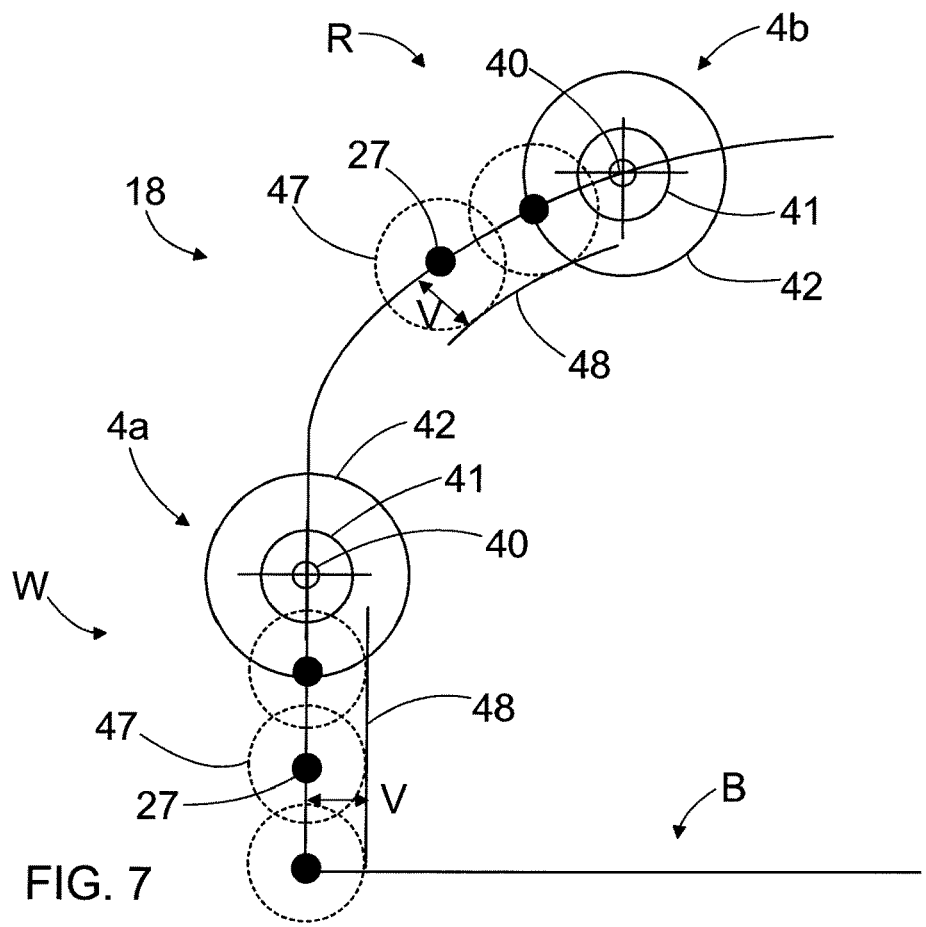
FIG. 7 is a schematic view showing procedure for defining position of a next drill hole line.

FIG. 7 discloses principles for defining position of a next drill hole line. At first two or more drill holes are drilled in a contour row 18. The drilling may be executed using one or more drilling units. In the shown situation there are two drilling units 4a and 4b, which are operating in different sections of the drill hole row. As can be noted, around realized drill hole bottoms 27 burden circles 47 may be shown after burdens are determined for the drill holes according to principles disclosed in this application. Thereafter a burden line 48 may be defined and shown on a display device. The next drill hole row will be placed according to the defined burden line 48.

Figure 8:
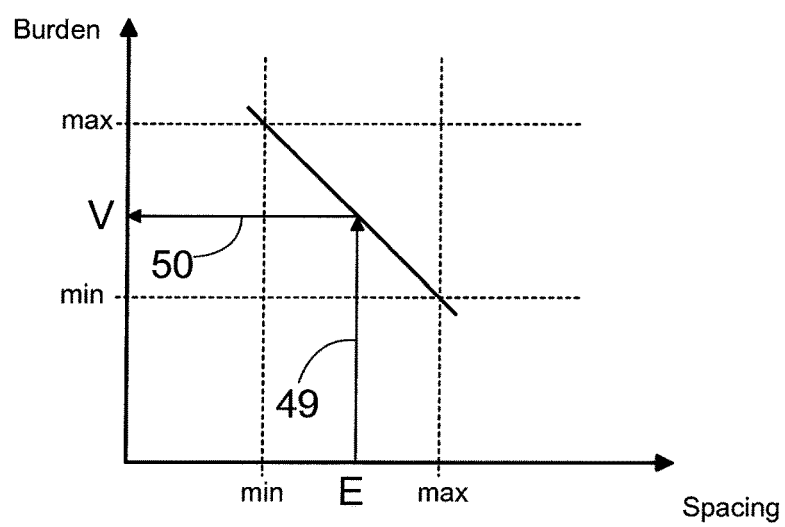
FIG. 8 is a schematic illustration of determining burdens by means of interpolation.

FIG. 8 shows how a burden can be determined by means of interpolation. When the realized spacing E between realized drill hole bottoms is between the predetermined spacing range, then a burden V can be interpolated between given minimum and maximum burdens. Arrows 49 and 50 illustrates the interpolation.

The computer program disclosed in this patent application may be recorded in non-transitory computer-readable media including program instructions to implement various operations embodied by a computer. The media may also include, alone or in combination with the program instructions, data files, data structures, and the like. Examples of computer-readable media or computer-readable storage devices include magnetic media such as hard disks, and optical media such as CR-ROM disks and DVDs, flash memory means, and hardware devices that are configured to store software. The computer-readable media may be a plurality of computer-readable storage devices in a distributed network, so that the program instructions are stored in a plurality of computer-readable storage devices and executed in a distributed fashion. The program instructions may be executed by one or more processors or processing devices.

The drawings and the related description are only intended to illustrate the idea of the invention. In its details, the invention may vary within the scope of the claims.

The invention claimed is:

1. An apparatus arranged to assign positions of drill holes for a round to be drilled by a rock drilling rig during a drilling process, the apparatus comprising:
at least one data processing device arranged to receive data from a drill hole length module on drill holes to be drilled for the round and an actual position and direction data of a tool connected to a rock drilling unit of the rock drilling rig;
a sensing arrangement arranged to determine the actual position of at least one realized drill hole bottom by detecting the position of the tool on the bottom of the round during the drilling process, wherein the processing device is arranged to determine for a new, currently active drill hole a forthcoming position of the drill hole bottom before drilling the new, currently active drill hole, the determining being based on a current location and direction of the tool and on a predetermined length of the new drill hole; and
an input device arranged to indicate the determined position of a forthcoming drill hole bottom of the new, currently active drill hole based only on a drilling pattern generated during the drilling process that takes into account the current location of the realized drill hole.

2. The apparatus as claimed in claim 1, further comprising at least one display device, the apparatus being configured to indicate the determined position of the new forthcoming drill hole bottom on the display device and in relation to the realized drill hole bottoms.

3. The apparatus as claimed in claim 2, wherein the processing device is arranged to employ a predetermined spacing range for the new drill hole bottom from the input device and indicate on the display device allowable spacing according to the spacing range and in relation to the closest realized drill hole bottom.

4. The apparatus as claimed in claim 3, wherein the processing device is configured to observe any exceeding of an allowed maximum spacing and propose an additional drill hole to be placed next to the previous realized drill hole.

5. The apparatus as claimed in claim 3, wherein the processing device is configured to observe if the realized spacing is shorter than the allowed minimum spacing and produce a data element including identification of the observed drill hole and information on the observed drill hole spacing.

6. The apparatus as claimed in claim 5, wherein the data element is a charging data element including information for decreasing the charging of the observed drill hole.

7. The apparatus as claimed in claim 2, wherein the display device shows the drill hole bottoms as a drill hole pattern having a plurality of drill hole rows, wherein a first drill hole row is an outermost contour row of the round, and a second drill hole row is an outermost aid row of the round and is located inside the contour row, the contour row and aid row each having wall sections, bottom sections and roof sections and wherein individual spacing ranges are determined for the wall, bottom and roof sections of each drill hole row.

8. The apparatus as claimed in claim 7, wherein the input device is arranged to receive a drilling scenario including at least one allowable spacing range of the drill hole bottoms, a predetermined minimum burden and a maximum burden calculated for a minimum spacing and a maximum spacing of the at least one spacing range, the processing device being arranged to define the realized spacing between the realized drill hole bottoms and determine burdens for the realized drill hole bottoms according to the realized spacing by means of interpolation between the minimum burden and the maximum burden.

9. The apparatus as claimed in claim 8, wherein the apparatus is configured to define the realized spacing between the realized drill hole bottoms in the first drill hole row and assign the second drill hole row at a distance from the first drill hole row according to the determined burdens of the realized drill hole bottoms in the first drill hole row.

10. The apparatus as claimed in claim 7, wherein the drill holes of the outermost drill hole row have look-out angles and the processing device is configured to determine the look-out angles for drill holes locating in the outermost drill hole row of the round.

11. The apparatus as claimed in claim 1, wherein the processing device is configured to receive a control command to initiate an automatic mode for drilling the new drill hole; execute, in the automatic mode, positioning of a tool at the starting point of the new drill hole; and execute, in the automatic mode, drilling of the new drill hole.

12. The apparatus as claimed in claim 1, wherein the apparatus is arranged in the rock drilling rig, the rock drilling unit including a carrier, at least one drilling boom, at least one rock drilling unit, a drilling tool connected to the drilling unit, and at least one control unit.

13. The apparatus as claimed in claim 12, wherein the data processing unit is integrated in the control unit of the rock drilling rig.

14. A method for drilling a round, the method comprising the steps of:
providing a rock drilling rig having at least one rock drilling unit and a tool connected to the drilling unit;
drilling several drill holes for the round with the rock drilling rig during a drilling process;
determining with a sensing arrangement an actual position and direction of the tool; and
determining with at least one data processing device a forthcoming position of a bottom of a new drill hole before drilling the new drill hole, wherein the position of the new drill hole bottom is determined on the basis of a current location and direction of the tool and on a planned length of the new drill hole based only on a drilling pattern generated during the drilling process that takes into account the current location of the realized drill hole.

15. The method according to claim 14, further comprising:
determining the actual position of at least one realized drill hole bottom by detecting the position of the tool on the bottom of the round during drilling;
placing the new drill hole next to the realized drill hole; and
indicating the position of the forthcoming drill hole bottom of the new drill hole in relation to the at least one realized drill hole bottom on the bottom of the round.

16. The method according to claim 14, further comprising placing the new drill hole according to at least one predetermined allowable spacing range defining a minimum drill hole spacing and a maximum drill hole spacing between the drill hole bottoms.

17. The method according to claim 16, further comprising:
placing new drill hole bottoms in a drill hole row;
drilling at least two drill holes of the drill hole row;
determining the spacing between the realized drill hole bottoms in the drill hole row;
employing predetermined minimum and maximum burdens corresponding to the predetermined minimum drill hole spacing and maximum drill hole spacing;
determining burdens for the realized drill hole bottoms according to the determined spacing by means of interpolation between the minimum burden and the maximum burden; and
defining the position of a next drill hole row according to the determined burdens of the realized drill hole bottoms located in the previous drill hole row.

* * * * *